(12) United States Patent
Kisaichi et al.

(10) Patent No.: US 11,035,698 B2
(45) Date of Patent: Jun. 15, 2021

(54) CRANK ANGLE DETECTION DEVICE

(71) Applicant: HONDA MOTOR CO., LTD., Tokyo (JP)

(72) Inventors: Toru Kisaichi, Kumamoto (JP); Nozomi Okada, Koshi (JP); Satoru Okada, Kumamoto (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 16/366,609

(22) Filed: Mar. 27, 2019

(65) Prior Publication Data

US 2019/0301897 A1    Oct. 3, 2019

(30) Foreign Application Priority Data

Mar. 29, 2018   (JP) ............................. JP2018-065156

(51) Int. Cl.
    *G01R 33/07*     (2006.01)
    *G01D 5/244*     (2006.01)
    *F02P 7/067*     (2006.01)

(52) U.S. Cl.
    CPC .............. *G01D 5/244* (2013.01); *F02P 7/067* (2013.01)

(58) Field of Classification Search
    CPC .......... G04C 5/00; G01R 33/07; G01R 15/20; G01D 5/244; H02K 49/102; F02P 7/067
See application file for complete search history.

(56) References Cited

U.S. PATENT DOCUMENTS

| | | | | |
|---|---|---|---|---|
| 5,183,341 A | * | 2/1993 | Ouchi | F16C 33/60 384/446 |
| 2004/0182142 A1 | | 9/2004 | Nakamura et al. | |
| 2005/0218889 A1 | * | 10/2005 | Yamada | F02B 39/10 324/207.25 |
| 2007/0033995 A1 | | 2/2007 | Namari et al. | |

(Continued)

FOREIGN PATENT DOCUMENTS

| | | | | |
|---|---|---|---|---|
| EP | 2 963 784 A1 | | 1/2016 | |
| EP | 2963784 A1 | * | 1/2016 | ............... H02K 9/06 |
| JP | H08-028293 A | | 1/1996 | |

(Continued)

OTHER PUBLICATIONS

Office Action dated Sep. 17, 2019 issued over the corresponding Japanese patent application No. 2018-065156.

(Continued)

*Primary Examiner* — Jermele M Hollington
*Assistant Examiner* — Taqi R Nasir
(74) *Attorney, Agent, or Firm* — Carrier Blackman & Associates, P.C.; William D. Blackman; Joseph P. Carrier

(57) ABSTRACT

Provided is a crank angle detection device that includes an ACG rotor supported by an end of a crank shaft and configured to rotate integrally with the crank shaft, a metal-plate-made pulsar ring including a ring-shaped plate portion and a detected portion that includes a plurality of convex portions formed at an outer circumference of the ring-shaped plate portion, and being configured to rotate integrally with the ACG rotor with the ring-shaped plate portion fixed to the ACG rotor, and a magnetic sensor arranged at an outer circumference of the pulsar ring and configured to detect the detected portion. Such a crank angle detection device is capable of detecting a crank angle with high accuracy.

14 Claims, 6 Drawing Sheets

(56) References Cited

U.S. PATENT DOCUMENTS

2007/0257668 A1* 11/2007 Nakagawa ........... G01D 5/2457
324/207.22

FOREIGN PATENT DOCUMENTS

| JP | H11-281312 A | 10/1999 | | |
|----|----|----|----|----|
| JP | H11281312 A | * | 10/1999 | .............. G01B 7/00 |
| JP | 2011-174517 A | | 9/2011 | |
| JP | 2011174517 A | * | 9/2011 | .............. F02B 61/02 |
| JP | 5942035 B2 | | 6/2016 | |
| WO | 2014/132719 A1 | | 9/2014 | |

OTHER PUBLICATIONS

Office Action, dated Sep. 30, 2020, issued in the corresponding Indian Patent Application No. 201914005069.

* cited by examiner

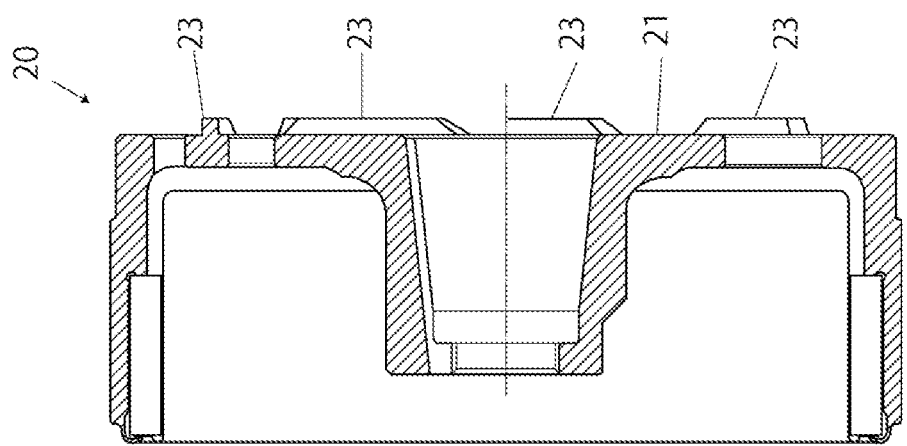
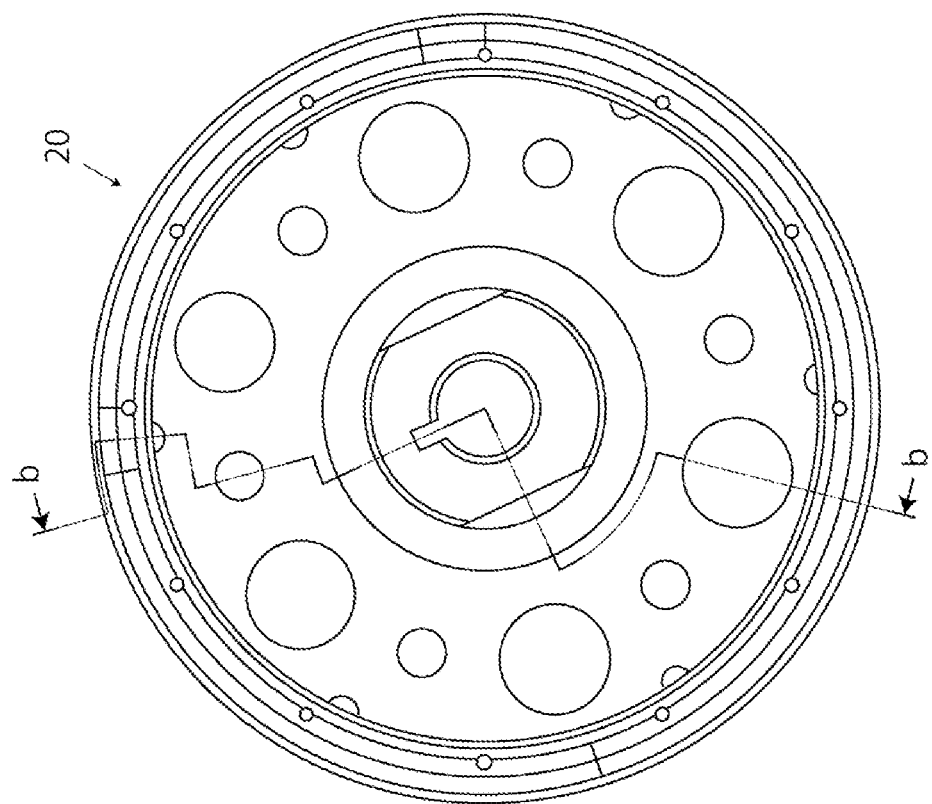

CRANK ANGLE DETECTION DEVICE

BACKGROUND

1. Technical Field

The present invention relates to a crank angle detection device.

2. Description of the Background

Conventionally, as disclosed, for example, in Patent Literature 1, there has been known a crank angle detection device to detect a rotational angle (crank angle) of a crank shaft by detecting, with an electromagnetic sensor, convex portions serving as a detected portion formed integrally with an outer circumferential face of an ACG rotor.

CITATION LIST

Patent Literature

Patent Literature 1: Japanese Patent No. 5942035

BRIEF SUMMARY

According to the conventional crank angle detection device described above, since the detected portion is configured of convex portions formed integrally with the outer circumferential face of the ACG rotor, it has been difficult to improve detection accuracy of a crank angle. This is because increasing the number of the convex portions is difficult when the convex portions are formed integrally with the outer circumferential face of the ACG rotor.

An object of the present invention is to provide a crank angle detection device capable of detecting a crank angle with high accuracy.

To achieve the abovementioned object, the present invention provides a crank angle detection device including an ACG rotor supported by an end of a crank shaft and configured to rotate integrally with the crank shaft; a metal-plate-made pulsar ring having outer diameter larger than outer diameter of the ACG rotor, the pulsar ring including a ring-shaped plate portion and a detected portion that includes a plurality of convex portions formed at an outer circumference of the ring-shaped plate portion and that forms predetermined clearance between an outer circumferential face of the ACG rotor as being bent toward the outer circumferential face of the ACG rotor in an axial direction of the crank shaft, and being configured to rotate integrally with the ACG rotor with the ring-shaped plate portion fixed to a side face of the ACG rotor; and a magnetic sensor arranged at an outer circumference of the pulsar ring and configured to detect the detected portion.

According to the crank angle detection device, since the detected portion is formed of the convex portions formed at the outer circumference of the metal-plate-made pulsar ring that is rotated integrally with the ACG rotor by being fixed to the ACG rotor, detection accuracy of a crank angle can be improved.

Since the pulsar ring is made of a metal plate separately from the ACG rotor, the convex portions serving as the detected portion can be easily formed, for example, with pressing.

Accordingly, the number of the convex portions serving as the detected portion can be easily increased, so that detection accuracy of a crank angle can be improved.

Further, the outer diameter of the pulsar ring is larger than the outer diameter of the ACG rotor. Accordingly, the number of the convex portions serving as the detected portion can be increased more easily, so that detection accuracy of a crank angle can be further improved.

Further, the convex portions serving as the detected portion are bent toward the axial direction of the crank shaft. Accordingly, a bent face is faced to the magnetic sensor and detected thereby, so that detection accuracy can be further increased.

Further, since the ring-shaped plate portion is fixed to a side face of the ACG rotor and the convex portions serving as the detected portion are bent toward an outer circumferential face of the ACG rotor, bent portions of the convex portions can be overlapped to the outer circumferential face of the ACG rotor in the axial direction of the crank shaft. Accordingly, length of the device can be lessened in the axial direction by the amount thereof.

In the crank angle detection device, a convex portion may be circularly arranged at the side face of the ACG rotor concentrically with the crank shaft, and an inner circumferential face of the ring-shaped plate portion may be intimately contacted to an outer circumferential face of the circularly-arranged convex portion.

With this configuration, since the pulsar ring can be attached to the ACG rotor with high accuracy, detection accuracy can be improved.

In the crank angle detection device, a starter gear may be arranged at the crank shaft as being adjacent to the ACG rotor, and the pulsar ring may be located between the ACG rotor and the starter gear.

With this configuration, the starter gear and the pulsar ring each having relatively large diameter are located close to the ACG rotor having relatively large diameter. Accordingly, space in a crank case can be effectively utilized.

In the crank angle detection device, the outer diameter of the pulsar ring may be larger than outer diameter of the starter gear.

With this configuration, the detected portion is enlarged in diameter and projected radially outward even from the starter gear, so that detection error with the magnetic sensor can be suppressed.

In the crank angle detection device, a one way clutch configured to transmit power from the starter gear to the crank shaft may be arranged as being adjacent to the side face of the ACG rotor, and the pulsar ring may be located as overlapping in the axial direction to an outer circumference of the one way clutch.

With this configuration, length of the device can be lessened in the axial direction.

BRIEF DESCRIPTION OF DRAWINGS

FIG. 3A is a left side view of an ACG rotor 20, and FIG. 3B is a sectional view at line b-b of FIG. 3A.

DETAILED DESCRIPTION

In the following, description will be provided on embodiments of a crank angle detection device of the present invention. In each drawings, the same reference sign is given to the same or corresponding component.

Figure 1:
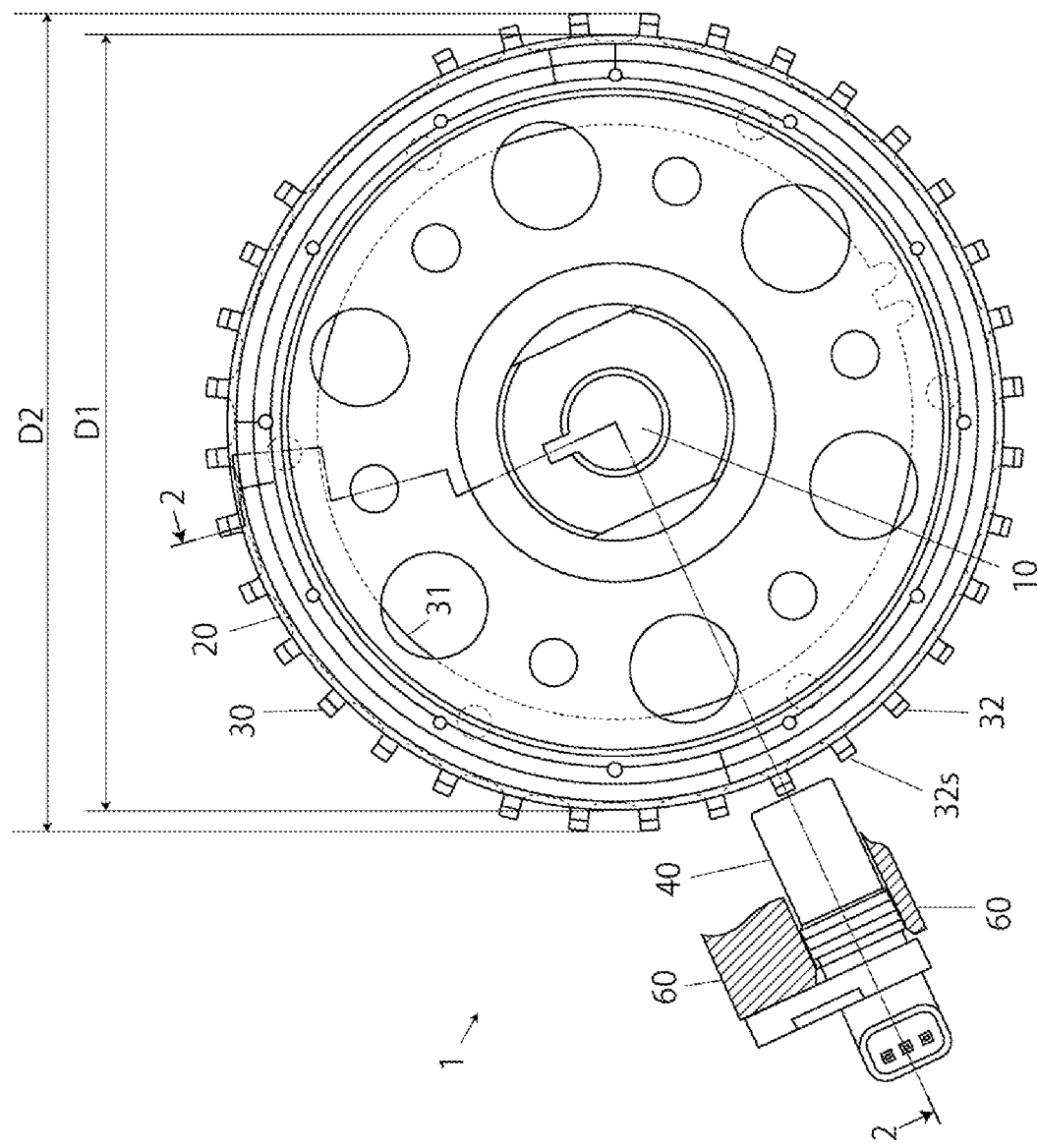
FIG. 1 is a side view illustrating a main part of an embodiment of a crank angle detection device of the present invention.
Figure 2:
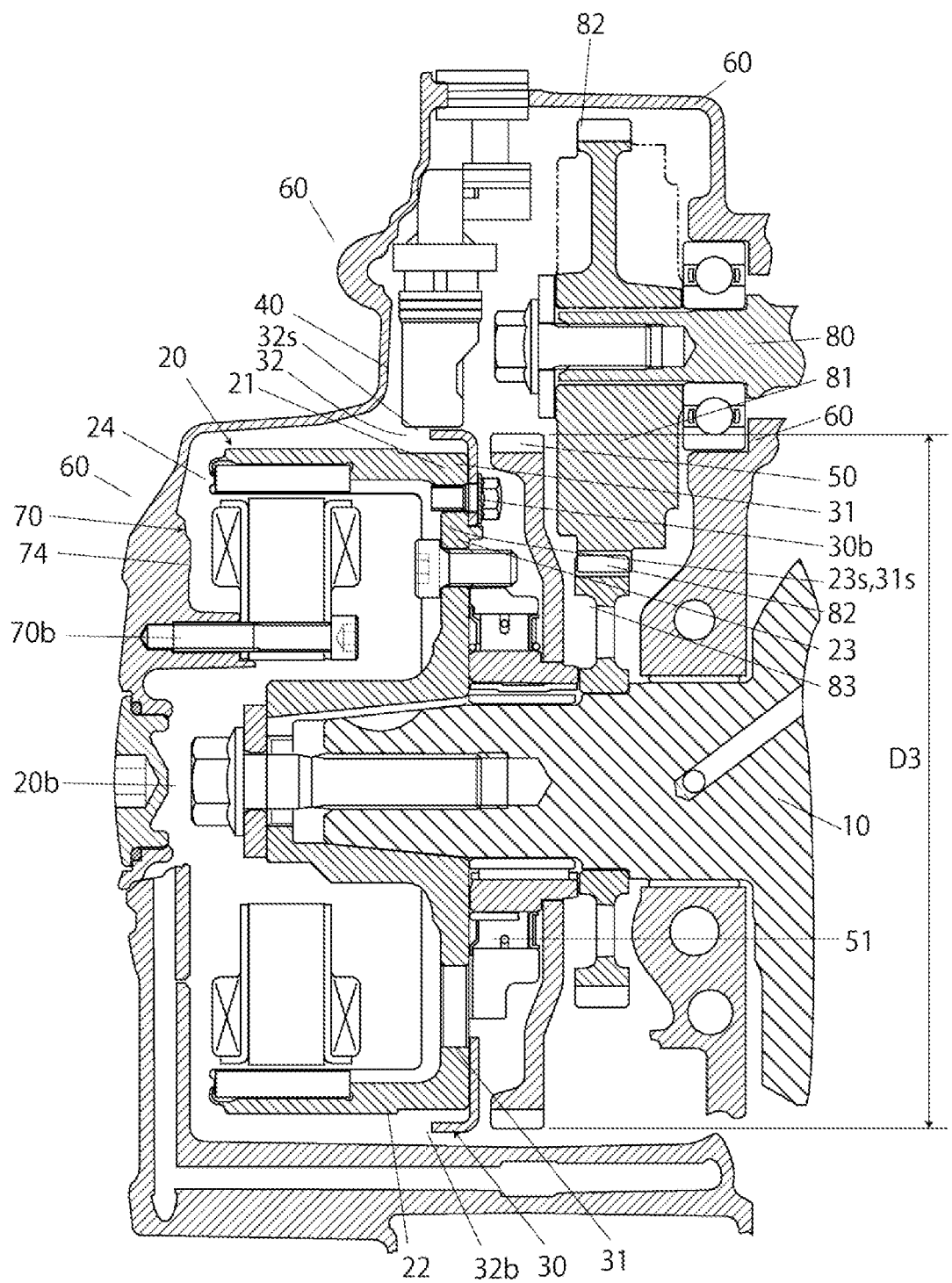
FIG. 2 is a sectional view at line 2-2 of FIG. 1

As illustrated in FIGS. 1 and 2, a crank angle detection device 1 of the present embodiment includes a crank shaft 10, an AC generator rotor (ACG rotor) 20, a pulsar ring 30 made of a metal plate, and a magnetic sensor 40.

The ACG rotor 20 is supported by an end of the crank shaft 10 and is rotated integrally with the crank shaft 10.

The pulsar ring 30 includes a ring-shaped plate portion 31 (see FIG. 5A), and a detected portion, which is formed of a plurality of convex portions 32, formed at an outer circumference of the ring-shaped plate portion 31. The ring-shaped plate portion 31 is fixed to the ACG rotor 20, so that the pulsar ring 30 rotates integrally with the ACG rotor 20.

The magnetic sensor 40 is arranged at the outer circumference of the pulsar ring 30 to detect the detected portion.

According to the crank angle detection device 1, since the detected portion is formed of the convex portions 32 formed at the outer circumference of the metal-plate-made pulsar ring 30 that is rotated integrally with the ACG rotor 20 by being fixed to the ACG rotor 20, detection accuracy of a crank angle can be improved.

As illustrated in FIG. 5 as well, since the pulsar ring 30 is made of a metal plate separately from the ACG rotor 20, the convex portions 32 serving as the detected portion can be easily formed, for example, with pressing.

Accordingly, the number of the convex portions 32 serving as the detected portion can be easily increased, so that detection accuracy of a crank angle can be improved.

As illustrated in FIG. 1, the outer diameter D2 of the pulsar ring 30 is larger than the outer diameter D1 of the ACG rotor 20.

With this configuration, the number of the convex portions 32 serving as the detected portion can be increased more easily, so that detection accuracy of a crank angle can be further improved.

As illustrated in FIGS. 1 and 2, the convex portions 32 serving as the detected portion are bent toward the axial direction of the crank shaft 10.

With this configuration, a bent face 32s is faced to the magnetic sensor 40 and detected as the detected portion, so that detection accuracy can be further increased.

Figure 5A:
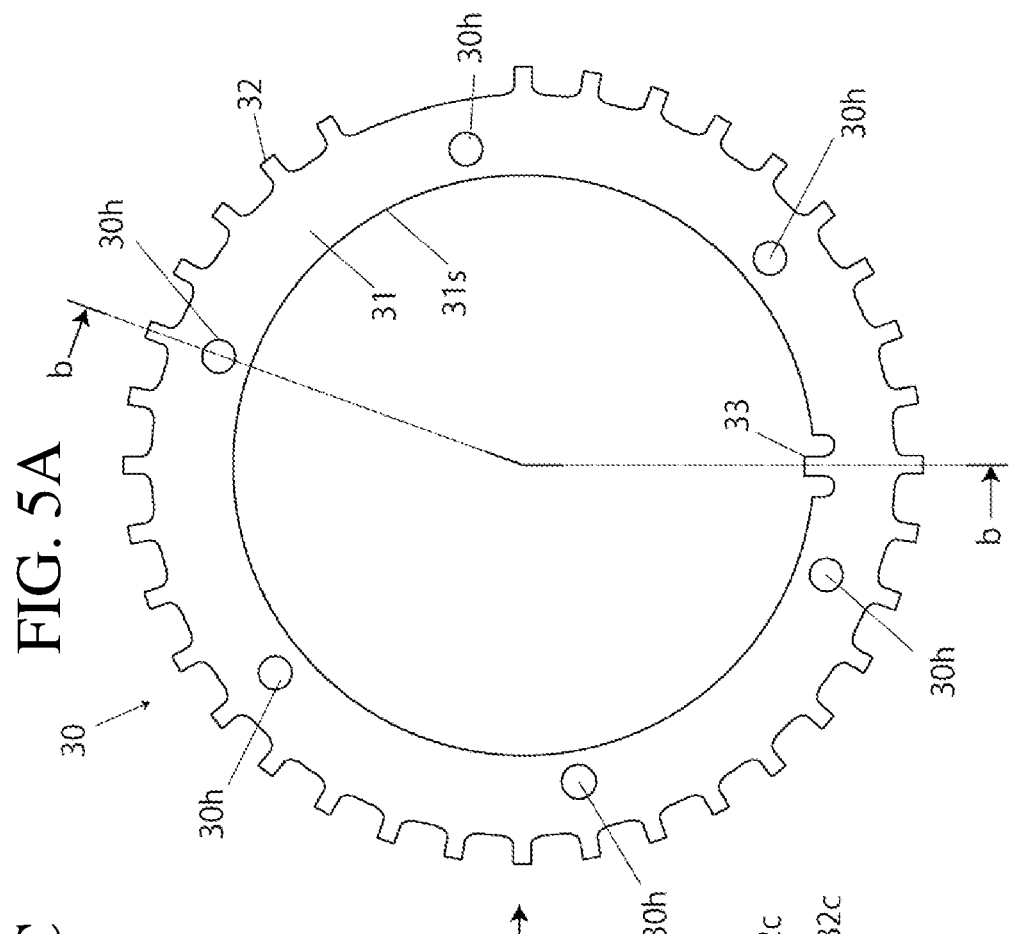
FIG. 5A is a right side view of a pulsar ring 30.
Figure 5C:
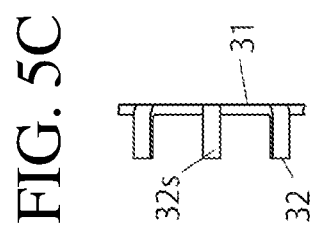
FIG. 5C is a perspective view in the direction of c with a part thereof eliminated.
Figure 5B:
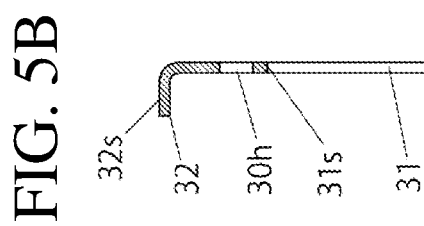
FIG. 5B is a sectional view at line b-b of FIG. 5A.
Figure 5D:
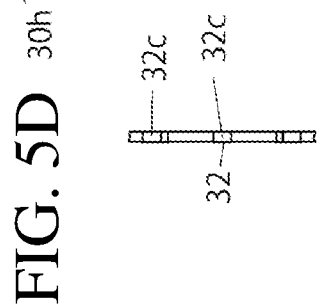
FIG. 5D is an explanatory view of a comparative example corresponding to the perspective view in the direction of c.

For example, as illustrated in FIG. 5D, it is possible to detect leading end faces 32c of the convex portions 32 even without being bent toward the axial direction of the crank shaft 10.

However, as in the present embodiment, when the convex portions 32 are bent toward the axial direction of the crank shaft 10, each bent face 32s (see FIG. 5C) having larger area than each unbent leading end face 32c can be detected by the magnetic sensor 40 as the detected portion as being faced thereto.

As illustrated in FIG. 2, the ring-shaped plate portion 31 is fixed to a side face 21 of the ACG rotor 20 and the convex portions 32 serving as the detected portion are bent toward an outer circumferential face 22 of the ACG rotor 20.

With this configuration, bent portions 32b of the detected portions 32 can be overlapped to the outer circumferential face 22 of the ACG rotor 20 in the axial direction of the crank shaft 10. Accordingly, length of the device can be lessened in the axial direction by the amount thereof.

Figure 4A:
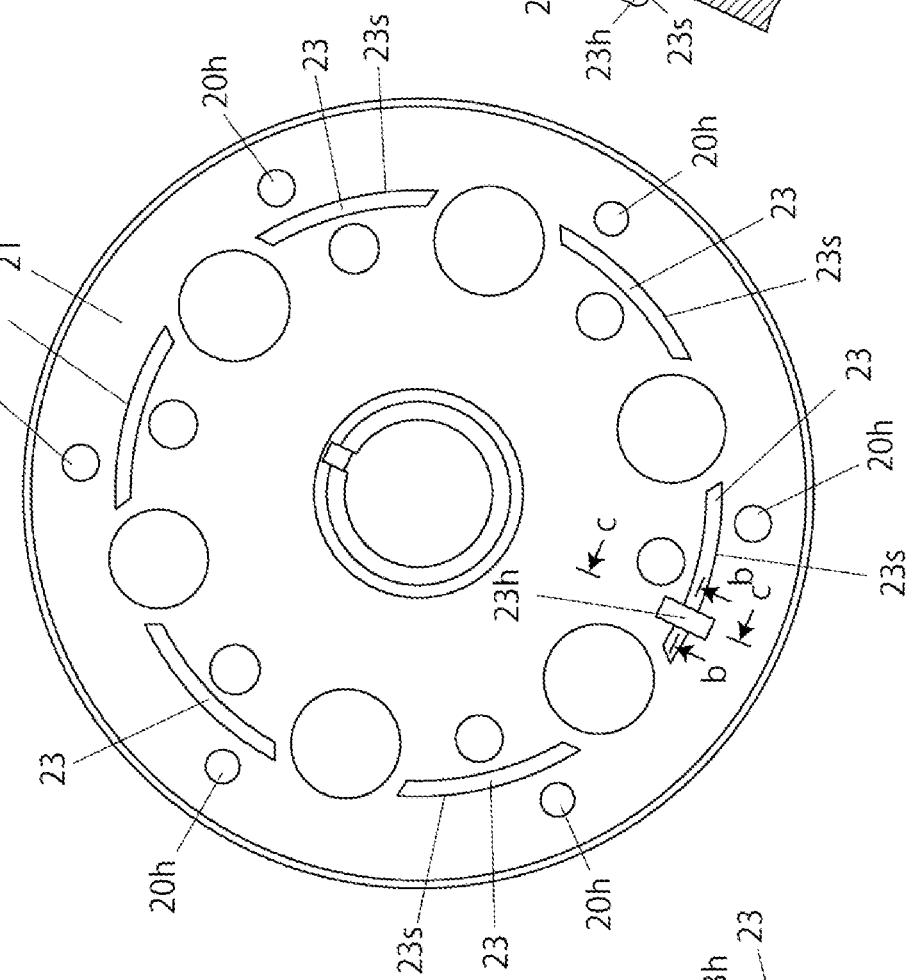
FIG. 4A is a right side view of the ACG rotor 20.
Figure 6:
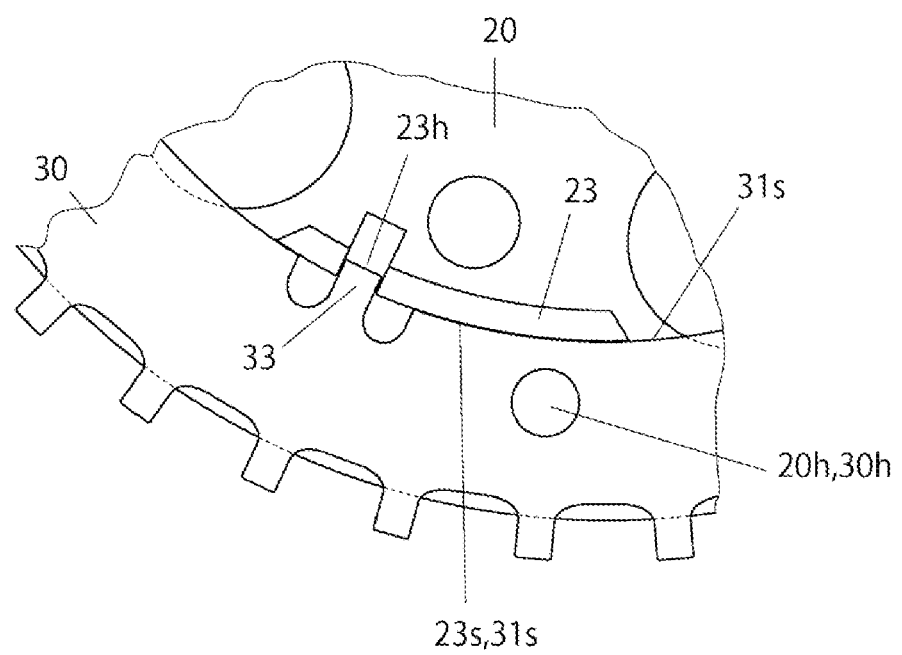
FIG. 6 is an explanatory view of a positioning portion, in the circumferential direction, of the pulsar ring 30 with respect to the ACG rotor 20.

As illustrated in FIGS. 3B and 4A, a plurality of convex portions 23, provided as arcuate ribs, are circularly arranged at the side face 21 of the ACG rotor 20 concentrically with the crank shaft 10. These arcuate ribs are integrally attached to, and project outwardly from the side face 21 of the AGC rotor 20. As illustrated in FIGS. 2 and 6, an inner circumferential face 31s (see FIGS. 5A and 5B) of the ring-shaped plate portion 31 is intimately contacted to outer circumferential faces 23s of the circularly-arranged convex portions 23.

With this configuration, since the pulsar ring 30 can be attached to the ACG rotor 20 with high accuracy, detection accuracy can be improved.

Figure 4C:
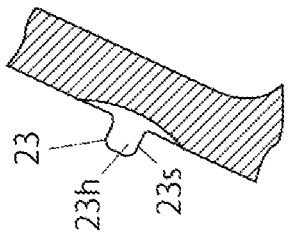
FIG. 4C is an enlarged sectional view at line c-c of FIG. 4A.
Figure 4B:
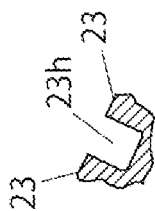
FIG. 4B is an enlarged sectional view at line b-b of FIG. 4A.

As illustrated in FIGS. 4A to 4C, a cutout notch portion 23h is formed at one of the circularly-arranged convex portions 23. Meanwhile, as illustrated in FIGS. 5A and 5B, a convex tooth portion (projection) 33 projected inward in the radial direction is arranged at a part of, and extends radially inwardly of the inner circumferential face 31s of the ring-shaped plate portion 31. As illustrated in FIG. 6, the inner circumferential face 31s of the ring-shaped plate portion 31 of the pulsar ring 30 is intimately contacted to the outer circumferential faces 23s of the circularly-arranged convex portions 23 of the ACG rotor 20 with the convex tooth portion 33 fitted to the cutout notch portion 23h. Accordingly, positioning of the pulsar ring 30 in the circumferential direction is performed as well with respect to the ACG rotor 20.

As illustrated in FIG. 2, the pulsar ring 30 is fixed to the ACG rotor 20 by fastening bolts 30b. In FIGS. 4A to 6, screw holes 20h for the bolts 30b are formed at the ACG rotor 20 and through holes 30h therefor are formed at the pulsar ring 30.

As illustrated in FIG. 2, a starter gear 50 is arranged at the crank shaft 10 as being adjacent to the ACG rotor 20. The pulsar ring 30 is located between the ACG rotor 20 and the starter gear 50.

With this configuration, the starter gear 50 and the pulsar ring 30 each having relatively large diameter are located close to the ACG rotor 20 having relatively large diameter. Accordingly, space in a crank case 60 can be effectively utilized.

The outer diameter D2 of the pulsar ring 30 is larger than the outer diameter D3 (see FIG. 2) of the starter gear 50.

With this configuration, the convex portions 32 serving as the detected portion is enlarged in diameter and projected radially outward even from the starter gear 50. Accordingly, detection error with the magnetic sensor 40 can be suppressed.

As illustrated in FIG. 2, the crank shaft 10 can be rotatably supported by the crank case 60. The ACG rotor 20 is fixed to an end of the crank shaft 10 by fastening a bolt 20b.

A stator 70 is arranged at the inside of the ACG rotor 20. The ACG rotor 20 and the stator 70 configures an AC generator (ACG).

The stator 70 is fixed using a bolt 70b to the crank case 60 also serving as an ACG case.

Magnets 24 arranged at the ACG rotor 20 and coils 74 arranged at the stator 70 are illustrated in FIG. 2.

As illustrated in FIG. 2, the magnetic sensor 40 is fixed to the inside of the crank case 60.

The starter gear 50 is fixed to the crank shaft 10 in a state of being relatively rotatable only in one direction via a one way clutch 51 to transmit power from the starter gear 50 to the crank shaft 10. The starter gear 50 is driven to rotate by an unillustrated starter motor at the time of starting an engine.

The one way clutch 51 is located adjacent to the side face 21 of the ACG rotor 20. The pulsar ring 30 is located as overlapping in the axial direction to the outer circumference of the one way clutch 51.

With this configuration, length of the device can be lessened in the axial direction.

As illustrated in FIG. 2, a balance shaft 80 is provided with a balance weight 81. The balance shaft 80 is rotatably attached to the crank case 60. Owing to that a driven gear 82 is driven by a drive gear 83 arranged on the crank shaft 10, the balance shaft 80 is driven to rotate.

Not limited to the abovementioned embodiment, the present invention may be appropriately modified within the scope of the present invention.

For example, in the abovementioned embodiment, a plurality of convex portions 23 (six pieces in FIG. 4) are circularly arranged at the side face 21 of the ACG rotor 20 in a discontinuous manner concentrically with the crank shaft 10. Here, the convex portions 23 may be formed in a continuous ring shape.

REFERENCE SIGNS LIST

10: Crank shaft
20: ACG rotor
21: Side face
22: Outer circumferential face
23: Circularly-arranged convex portion
30: Pulsar ring
31: Ring-shaped plate portion
32: Convex portion (Detected portion)
40: Magnetic sensor
50: Starter gear

What is claimed is:

1. A crank angle detection device, comprising:
   an ACG rotor supported by an end of a crank shaft and configured to rotate integrally with the crank shaft;
   a metal-plate-made pulsar ring formed as a separate component from the AGC rotor and operatively attached thereto, the pulsar ring having an outer diameter larger than an outer diameter of the ACG rotor, the pulsar ring including
   a ring-shaped plate portion fixed to a side face of the ACG rotor, and
   a detected portion comprising a plurality of convex portions formed at an outer circumference of the ring-shaped plate portion, wherein the detected portion is bent toward the outer circumferential face of the ACG rotor in an axial direction of the crank shaft, the detected portion defining a predetermined clearance between outer end portions of the convex portions and an outer circumferential face of the ACG rotor, the pulsar ring configured to rotate integrally with the ACG rotor; and
   a magnetic sensor arranged at an outer circumference of the pulsar ring and configured to detect the detected portion.

2. The crank angle detection device according to claim 1, wherein a convex portion is circularly arranged at the side face of the ACG rotor concentrically with the crank shaft, the convex portion comprising a plurality of arcuate ribs integrally attached to and projecting outwardly from the side face, and
   wherein an inner circumferential face of the ring-shaped plate portion is intimately contacted to an outer circumferential face of the circularly-arranged convex portion.

3. The crank angle detection device according to claim 1, wherein:
   a starter gear is arranged at the crank shaft as being adjacent to the ACG rotor, and
   the pulsar ring is located between the ACG rotor and the starter gear.

4. The crank angle detection device according to claim 3, wherein the outer diameter of the pulsar ring is larger than outer diameter of the starter gear.

5. The crank angle detection device according to claim 3,
   wherein a one way clutch configured to transmit power from the starter gear to the crank shaft is arranged as being adjacent to the side face of the ACG rotor, and
   the pulsar ring is located as overlapping in the axial direction to an outer circumference of the one way clutch.

6. The crank angle detection device according to claim 2, wherein:
   a starter gear is arranged at the crank shaft as being adjacent to the ACG rotor, and
   the pulsar ring is located between the ACG rotor and the starter gear.

7. The crank angle detection device according to claim 6, wherein the outer diameter of the pulsar ring is larger than outer diameter of the starter gear.

8. The crank angle detection device according to claim 4, wherein
   a one way clutch configured to transmit power from the starter gear to the crank shaft is arranged as being adjacent to the side face of the ACG rotor, and
   the pulsar ring is located as overlapping in the axial direction to an outer circumference of the one way clutch.

9. The crank angle detection device according to claim 7,
   wherein a one way clutch configured to transmit power from the starter gear to the crank shaft is arranged as being adjacent to the side face of the ACG rotor, and
   the pulsar ring is located as overlapping in the axial direction to an outer circumference of the one way clutch.

10. The crank angle detection device according to claim 2, wherein one of the arcuate ribs has an open notch formed therein, and the pulsar ring has a tooth thereon extending radially inward of the inner circumferential face thereof, the tooth fitting into the notch of said one of the arcuate ribs.

11. A crank angle detection device, comprising:
   an ACG rotor supported by an end of a crank shaft and configured to rotate integrally therewith, the ACG rotor having a side face with a plurality of arcuate ribs integrally attached to and thereon, each of the arcuate ribs having an outer circumferential face, wherein one of the arcuate ribs has an open notch formed therein;
   a metal-plate-made pulsar ring formed as a separate component from the AGC rotor and being operatively attached thereto, the pulsar ring having an outer diameter larger than an outer diameter of the ACG rotor, the pulsar ring including a ring-shaped plate portion having a circular opening formed therein with an inner circumferential face, and a tooth extending radially inward beyond the inner circumferential face, wherein the inner circumferential face is in contact with each of the outer circumferential faces of the arcuate ribs, and wherein the tooth fits into the open notch of said one of the arcuate ribs;

the pulsar ring further comprising a detected portion that includes a plurality of convex portions formed at an outer circumference of the ring-shaped plate portion, each of the convex portions being bent toward an outer circumferential face of the ACG rotor in an axial direction of the crank shaft, the pulsar ring configured to rotate integrally with the ACG rotor with the ring-shaped plate portion fixed to a side face of the ACG rotor; and a magnetic sensor arranged at an outer circumference of the pulsar ring and configured to detect the detected portion.

12. The crank angle detection device according to claim 11, wherein:

a starter gear is arranged at the crank shaft as being adjacent to the ACG rotor, and the pulsar ring is located between the ACG rotor and the starter gear.

13. The crank angle detection device according to claim 12, wherein the outer diameter of the pulsar ring is larger than outer diameter of the starter gear.

14. The crank angle detection device according to claim 12, wherein a one way clutch configured to transmit power from the starter gear to the crank shaft is arranged as being adjacent to the side face of the ACG rotor, and the pulsar ring is located as overlapping in the axial direction to an outer circumference of the one way clutch.

* * * * *